United States Patent [19]
Drisko et al.

[11] Patent Number: 6,157,732
[45] Date of Patent: *Dec. 5, 2000

[54] IMAGE PROCESSING SYSTEM AND METHOD USING SUBSAMPLING WITH CONSTRAINTS SUCH AS TIME AND UNCERTAINTY CONSTRAINTS

[75] Inventors: Robert Drisko, Concord; Ivan A. Bachelder, Newton, both of Mass.

[73] Assignee: Cognex Corporation, Natick, Mass.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/287,637

[22] Filed: Apr. 7, 1999

Related U.S. Application Data

[63] Continuation of application No. 08/819,876, Mar. 18, 1997, Pat. No. 5,995,648.

[51] Int. Cl.$^7$ ..................................................... G06K 9/00
[52] U.S. Cl. ........................................... 382/148; 382/298
[58] Field of Search ..................................... 382/141, 145, 382/148, 149, 147, 151, 152, 154, 298–300; 348/86, 87, 94, 125, 126

[56] References Cited

U.S. PATENT DOCUMENTS

| | | | |
|---|---|---|---|
| 4,728,195 | 3/1988 | Silver | 356/394 |
| 4,752,898 | 6/1988 | Koenig | 364/559 |
| 4,972,359 | 11/1990 | Silver et al. | 364/728.05 |
| 5,179,441 | 1/1993 | Anderson et al. | 358/88 |
| 5,255,352 | 10/1993 | Falk | 395/125 |
| 5,291,563 | 3/1994 | Maeda | 382/282 |
| 5,367,439 | 11/1994 | Mayer et al. | 382/212 |
| 5,371,690 | 12/1994 | Engel et al. | 364/570 |
| 5,511,137 | 4/1996 | Okada | 382/298 |
| 5,513,275 | 4/1996 | Khalaj et al. | 382/148 |
| 5,517,235 | 5/1996 | Wasserman | 382/148 |
| 5,694,486 | 12/1997 | Shigeeda et al. | 382/197 |
| 5,696,848 | 12/1997 | Patti et al. | 382/254 |
| 5,724,439 | 3/1998 | Mizuoka et al. | 382/149 |
| 5,758,043 | 5/1998 | Takizawa et al. | 395/115 |
| 5,764,536 | 6/1998 | Yamamoto et al. | 364/550 |
| 5,768,409 | 6/1998 | Csipkes et al. | 382/151 |
| 5,784,484 | 7/1998 | Umezawa | 382/148 |

OTHER PUBLICATIONS

Cognex 3000/4000/5000 Vision Tools Revision #7.4 #590–0136 Users Manual.
Cognex 4000/5000 SMD Placement Guide Package Release 3.2 #590.1039 User Manual, 1996.
Cognex 4000/5000 SMD Placement Guidance Package User's Manual, rev. 3.2., 1996. Ch.7, pp. 269–310.
Gognex 4000/5000 SMD Placement Guidance Package User's Manual, rev. 3.2, 1996. Ch. 11, pp. 357–372.
Cognex 3000/4000/5000 Programmable Vision Engines Image Processing, rev. 7.4, 1996. Ch. 2, pp. 58–59.
Cognex 3000/4000/5000 Programmable Vision Engines Vision Tools, rev. 7.4, 1996. Ch.11, pp. 484–486.

*Primary Examiner*—Bhavesh Mehta
*Attorney, Agent, or Firm*—Anthony L. Miele; Russ Weinzimmer

[57] ABSTRACT

A method and apparatus subsamples, in a constraint satisfying manner, an image for subsequent processing of the subsampled image. The subsampling is based on constraints provided for the subsequent image processing. A subsampling factor or pair of factors are determined for the image and the image is subsampled by the subsampling factor(s). The constraints comprise at least time constraints, uncertainty constraints, accuracy constraints or implementation constraints. When time constraints are given, the constraints specify a function of the time needed for the subsequent image processing along with at least a maximum and a minimum time that the subsequent image processing should take. When uncertainty constraints are specified, the constraints give a function of the uncertainty in the subsequent image processing and at least a maximum and a minimum uncertainty required from the subsequent image processing. When the constraints specify accuracy constraints, the constraints specify a function of the accuracy of the subsequent image processing at least a maximum and a minimum accuracy required from the subsequent image processing.

17 Claims, 4 Drawing Sheets

Fig. 1 (Prior Art)
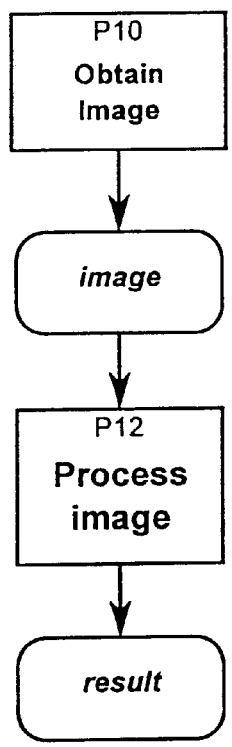
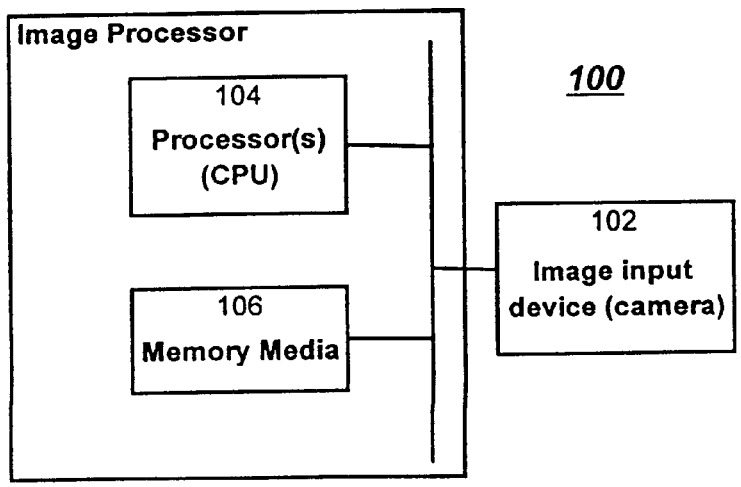
Fig. 3

IMAGE PROCESSING SYSTEM AND METHOD USING SUBSAMPLING WITH CONSTRAINTS SUCH AS TIME AND UNCERTAINTY CONSTRAINTS

This is a continuation of application Ser. No. 08/819,876 filed Mar. 18, 1997 now U.S. Pat. No. 5,995,648.

BACKGROUND OF THE INVENTION

1. Reservation of Copyright

The disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyrights whatsoever.

2. Field of Invention

The present invention relates to image processing, and, more particularly, to a method and apparatus for subsampling an image so that the subsampled image may be further processed within certain constraints.

3. Description of Background Information

In the field of image processing, whatever its ultimate application, the general conventional approach is that shown in FIG. 1, wherein first an image is obtained (at P10) and then the image is processed (at P12). Typically, the processing of the image becomes more accurate as the resolution of the image increases. That is to say, the greater the resolution of the image, the more accurate the result of the image processing. However, image processing time is almost always also a function of the resolution of the image, so that the greater the resolution (and therefore the accuracy), the greater the amount of time taken to process the image.

If image processing time is not an issue, the best possible accuracy can be achieved. However, in many applications, processing time and memory space constraints exist, and consequently accuracy must be sacrificed to operate, if possible, within these constraints.

In general, performing image processing (P12 in FIG. 1), using the entire input image may cause the processing to take too long and/or require the use of too much memory space. On the other hand, using too little of the input image may cause the result of subsequent image processing to not be sufficiently accurate.

SUMMARY OF THE INVENTION

The present invention is provided to improve upon machine vision and image processing systems. The present invention may be further provided to allow the image processing phase of an image processing system to run within a constraint satisfying time range while simultaneously achieving a result within a required accuracy range. The present invention may be still further provided to allow an image processing algorithm in an image processing system to run within an optimal time range while simultaneously achieving a result within a required accuracy range.

In order to achieve these ends, one or more aspects of the present invention may be followed in order to bring about one or more specific objects and advantages, such as those noted below.

One object of the present invention is to provide an image processing system which subsamples, in a constraint satisfying manner, an input image based on the size of the image and on the expected time, space and accuracy requirements of subsequent (downstream), and possibly prior (upstream), computational processes.

Another object of this inventor is to provide an image processing system which subsamples, in a constraint satisfying manner, an input image based on the size of the image and on the expected time, space and accuracy requirements of other computational processes. The other processes may be prior to the subsampling, after the subsampling, or both. The requirements may also include implementation limitations, such as, for example, allowed image sizes and allowed subsampling factor(s) and the like.

One aspect this invention is a method, in an image processing system, of subsampling, in a constraint satisfying manner, an image for subsequent processing of the subsampled image. The method includes providing constraints for the prior and/or subsequent image processing; and subsampling the image based on at least the image size so as to satisfy the provided constraints.

In another aspect, this invention is a computer-readable medium encoded with a program for subsampling, in a constraint satisfying manner, an-image for subsequent processing of the subsampled image. The program includes providing constraints for the prior and/or subsequent image processing; and subsampling the image based on at least the image size so as to satisfy the provided constraints.

In yet another aspect, this invention is a device, in an image processing system, for subsampling, in a constraint satisfying manner, an image for subsequent processing of the subsampled image. The device includes means for providing constraints for the prior and/or subsequent image processing; and means for subsampling the image based on at least the image size so as to satisfy the provided constraints.

In some preferred embodiments, the subsampling means comprises means for determining a subsampling factor (or factors) for the image; and means for subsampling the image by the subsampling factor(s).

Preferably the subsampling includes determining a subsampling factor or factors for the image; and subsampling the image by the subsampling factor or factors.

In preferred embodiments the constraints are performance constraints.

In preferred embodiments the constraints comprise at least one of time constraints, uncertainty constraints and accuracy constraints. In some situations the uncertainty constraints are the inverse of the accuracy constraints. Time constraints can include an estimate of the time needed for both the subsampling and the subsequent image processing as well as, possibly, the time needed for prior processing. This estimate is expressed as a function of either the size of the subsampled image (width and height) or of the subsampling factors. The time constraints also include at least one of a maximum and a minimum time that both the subsampling and the subsequent (and possibly prior) image processing should take. Uncertainty constraints include an estimate of the uncertainty in one or more results of subsequent image processing. This uncertainty estimate is a function of either the size of the subsampled image (width and height) or of the subsampling factors. The uncertainty constraints also include at least one of a maximum and minimum uncertainty required of subsequent image processing.

Accuracy constraints include an estimate of the accuracy in one or more results of subsequent image processing. This accuracy estimate is a function of either the size of the subsampled image (width and height) or of the subsampling factors. The accuracy constraints also include at least one of a maximum or minimum accuracy required of subsequent image processing.

The constraints also include implementation (that is, hardware/software) related constraints such as, for example, constraints relating to allowed image sizes, allowed subsampling factors and the like.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein:

FIG. 1 is a block diagram illustrating a conventional image processing system;

FIG. 3 is a block diagram illustrating aspects of a typical image processor on which the present invention operates;

DETAILED DESCRIPTION OF THE PRESENTLY PREFERRED EXEMPLARY EMBODIMENTS

Figure 2:
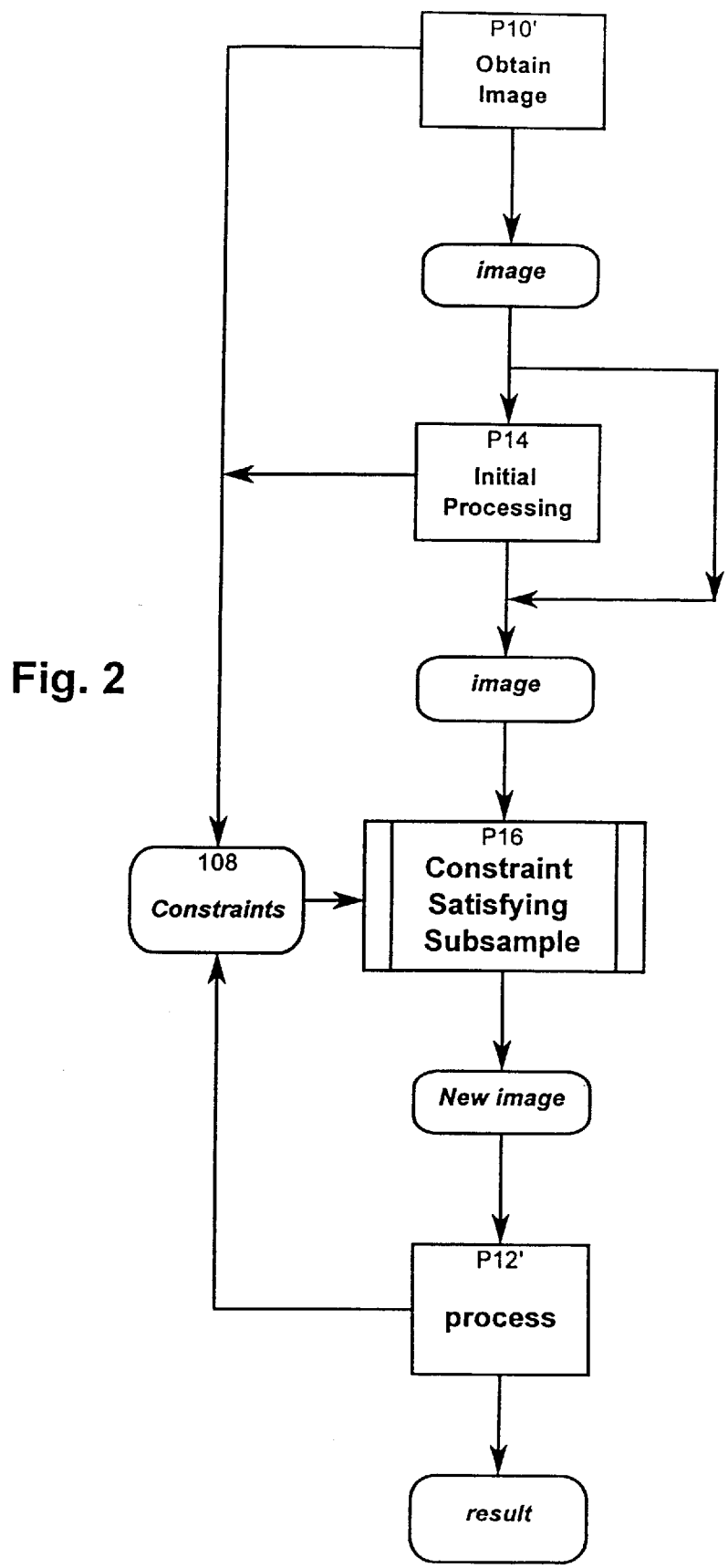
FIG. 2 is a block diagram illustrating an image processing system according to the resent invention.
Figure 4:
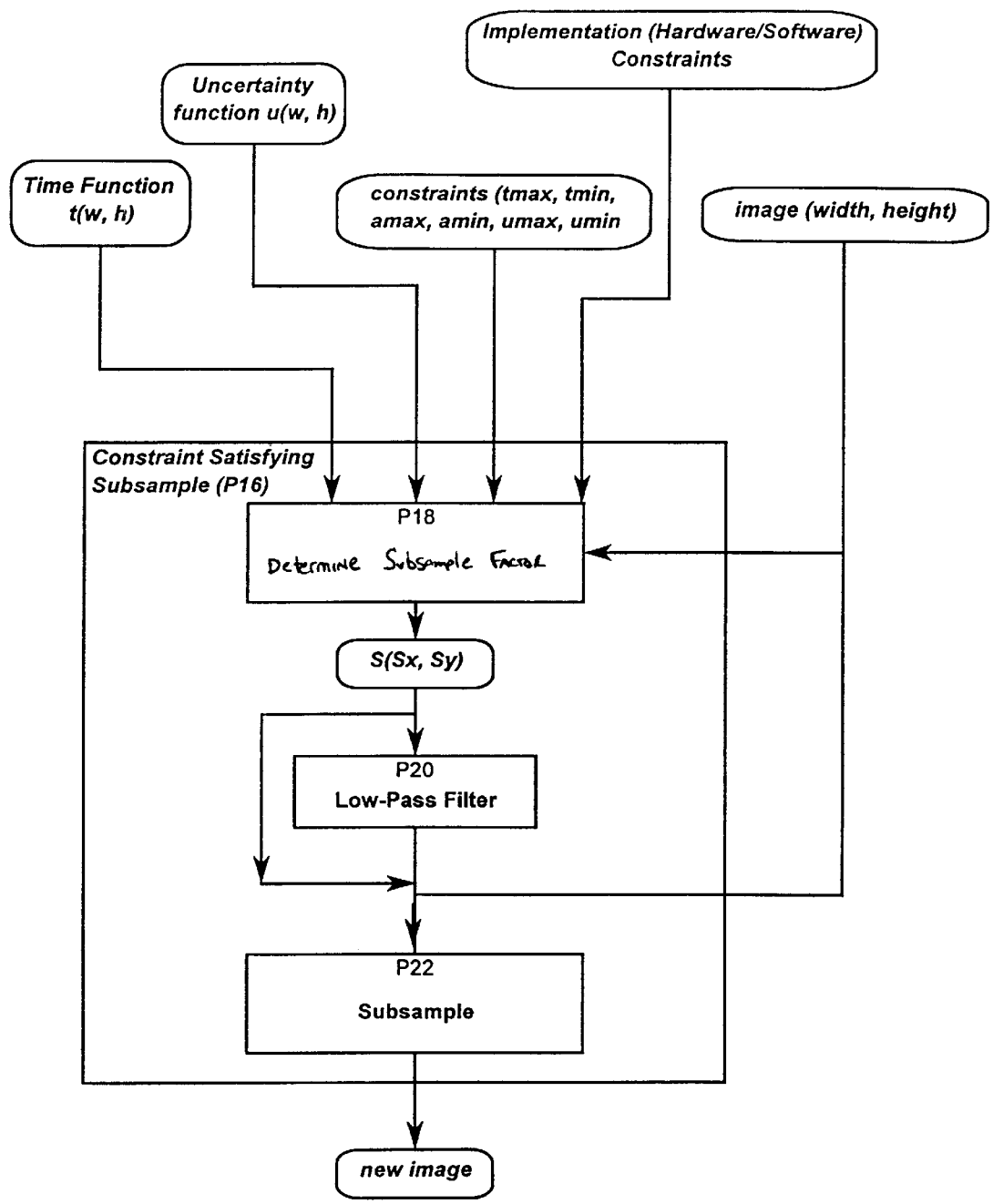
FIG. 4 shows an image subsampler according to the present invention.

A preferred embodiment of this invention is shown in FIGS. 2, 3 and 4, where, in FIG. 2, an image processing system includes obtaining an image at P10', performing some possible initial processing on the image at P14 followed by subsampling in a constraint satisfying manner the image at P16, followed by processing the subsampled new image at P12'.

As shown in FIG. 3, a typical image processor 100 includes an input device such as a camera 102. The processor 100 also includes a processor such as CPU 104 and memory 106. The processor 104 may be a special purpose image processor or it may be a general purpose processor. The memory 106 may comprise various types of memory, including RAM, external memory devices such as disks, and the like. Images from the input device 102 are stored in the memory 106 and processed by the processor 104.

The present invention can be implemented as part of the processor 104 or as a program residing in memory 106 and running on the processor 104, or as a combination of program and specialized hardware. When in memory 106, the program can be in a RAM, a ROM, an internal or external disk, a CD ROM, an ASIC or the like. In general, when implemented as a program or in part as a program, the program can be encoded on any computer-readable medium or combination of computer-readable media, including but not limited to a RAM, a ROM, a disk, an ASIC, a PROM and the like.

Thus, the image may be obtained (at P10') in any known manner using any known device such as a camera 102 or the like.

The image processing (at P14 and P12') may be for any purpose, and the specifics of the implementation of this invention may vary, depending on the purpose.

The constraint satisfying subsampling process (at P16) takes as input the image (from P10' or from P14 if initial processing was performed) along with various constraints 108. The constraints 108 input to the subsampler (at P16) can relate to time requirements of the processing (at P12' and/or at P14), accuracy requirements of the processing (at P12' and/or at P14), certainty requirements of the processing (at P12' and/or at P14), space requirements of the processing and repeatability requirements of the processing and the like. The constraints 108 may also relate to implementation limitations, and/or requirements of the subsequent (or prior) processing. The constraints 108 input to the subsampler (at P16) may change on a per image basis.

Detailed Operation

The constraint satisfying subsampling process (at P16) is described in greater detail with reference to FIG. 4. The more the image is subsampled, the faster the subsequent processing (at P12') will run, but the less accurate subsequent processing will be. The subsampling factors must therefore be determined such that both the speed requirements and the accuracy requirements (for the processing that follows) are satisfied.

The image subsampling process (at P16) either generates a small enough version of an image such that subsequent image processing operations are as fast as possible, or it generates a large enough image such that subsequent image processing operations are as accurate as possible. The constraint satisfying subsampling process additionally keeps the time of subsequent operations on the image within specified bounds, while also keeping the accuracy of subsequent operations on the image within specified bounds.

Performing constraint satisfying subsampling requires knowledge of (a) the time that the subsampling, subsequent, and/or prior operations will take, preferably as a function of subsampled image size; and (b) the required accuracy of subsequent and possibly prior operations, preferably as a function of the subsampled image size or resolution. These two functions (of time and accuracy) are specified as t and a, respectively. The accuracy a may, alternatively, be specified as an uncertainty, u. Thus, for example, instead of specifying that a process should be accurate to within five degrees, it could be stated that the uncertainty in the process should be no greater than five degrees.

Determining the constraint satisfying subsampling factor (s) (at P22) comprises determining the image sizes for t which yields results between the maximum and minimum allowed times, as well as the image resolution for which the function a yields the appropriate accuracy (or for which the function u yields the appropriate uncertainty). Once the image size bounds are determined, the corresponding subsampling factors can be determined. Similarly, the subsampling factor(s) is (are) determined from the image for the resolution bounds, given the initial resolution of the image. The set of possible subsampling factors for which the constraint satisfying subsampling can be achieved is then determined by the intersection of the two sets of acceptable values for the time function t and for the accuracy function a. Finally, one of the possible subsamples factors is chosen that is allowable by the hardware/software constraints, preferably one that yields the fastest time or lowest uncertainty.

The process of determining the subsample factor (at P18) is now described. In what follows, the uncertainty function u is used instead of the accuracy function a.

The terms "subsequent processing," "subsequent operations," or "downstream operations" refer to the image processing (at P12') after the input image (obtained at P10') has been subsampled according to the present invention.

The subsampling factor S is generally a pair of independent factors ($S_x$, $S_y$) for the X and Y dimensions of the image, respectively.

Generally, determination of the subsampling factors can be performed as follows:

Given as input:

A function t(w,h) of w and h (the width and height of the subsampled image, in pixels) that gives the time needed for the subsampling operation and subsequent, downstream operations;

a function u(w,h) of w and h, that gives the uncertainty required by subsequent operations;

$w_c$, $h_c$, the width and height of the current image (the subsampled image has a size of (w, h), where $w=w_c/S_x$ and $h=h_c/S_y$, which implies that $S_x=w_c/w$ and $S_y=h_c/h$);

$t_{max}$, $t_{min}$, the maximum and minimum time that the subsequent operations should take (time constraints);

$u_{max}$, $u_{min}$ the maximum and minimum uncertainty required from subsequent operations (uncertainty/accuracy constraints);

$w_{max}$, $w_{min}$, the maximum and minimum image width (size constraints);

$h_{max}$, $h_{min}$, the maximum and minimum image height (size constraints);

implementation constraints (for example, hardware constraints such as sets of allowable subsampling factors $S_x$ and $S_y$ and image sizes w and h); and the input image.

As used herein, the term "image" generally refers to digital data representing a physical scene. Preferably an image is represented as a two-dimensional array of digital pixel values, each pixel value representing an aspect of the physical scene at a particular location in the scene.

Output:

$S_x$, $S_y$, the subsampling factors in x and y that satisfy the constraints, along with an image subsampled by this factor.

Process

Create space for a two-dimensional binary matrix T of size ($w_{max}-w_{min}$, $h_{max}-h_{min}$) and space for a two-dimensional binary matrix U of size ($w_{max}-W_{min}$, $h_{max}-h_{min}$).

For each element of T(w, h) of the matrix T, with the index w ranging from $w_{min}$ to $w_{max}$ and the index h ranging from hmin to $h_{max}$, set the value of the binary matrix location T(w, h) to 1 if the value of the time function t(w,h) is greater than $t_{min}$ and the value of the time function t(w,h) is less than $t_{max}$, otherwise, set the value of the binary matrix location T(w,h) to 0.

For each element U(w,h) of the binary matrix U, with the index w ranging from $W_{min}$ to $w_{max}$, and the index h ranging from $h_{mmin}$ to $h_{max}$, set the value of the binary matrix location U(w, h) to 1 if the value of the uncertainty function u(w, h) is greater than $u_{min}$, and the value of the uncertainty function u(w, h) is less than $u_{max}$ otherwise, set the value of the binary matrix location U(w,h) to 0.

Next, create space for a new two-dimensional binary matrix I of size ($w_{max}-w_{min}$, $h_{max}-h_{min}$)

Set the binary matrix I=T & U, where "&" is the logical "AND" of its two inputs. Thus, for each w in the range ($w_{min}$ to $w_{wax}$) and each h in the range ($h_{min}$ to $h_{max}$), set the value of the binary matrix I (w, h) to 1 if and only if both the value of the matrix T(w, h) is 1 and the value of the matrix U(w, h) is 1.

Next, if implementation constraints are being used, for each w in the range $w_{min}$ to $w_{max}$ and h in the range $h_{min}$ to $h_{max}$, set the value of the binary matrix I(w, h) to 1 if (a) I(w, h) is already 1 and (b) and $w_c/w$ and $h_c/h$ are allowable subsampling factors $S_x$ and $S_y$ respectively, according to the implementation (hardware) constraints.

To determine an constraint satisfying subsampling factor, determine w, h for which the value of the binary matrix I(w, h) is 1, that is, such that both the value of T(w, h) is 1 and the value of U(w, h) is 1, and either the function t(w, h) or the function u(w, h) is minimized.

Set the subsampling factors $S_x=w/w_c$ and $S_y=h/h_c$.

Next, subsample (at P22) the image by the factors $S_x$, $S_y$. To avoid aliasing, subsampling typically requires running a low-pass filter (at P20) with bandwidth of no more than $1/(2S_x)$ and $1/(2S_y)$ in x and y, respectively (according to the Nyquist sampling theorem).

Subsampling may be performed in any known manner. In general every $S_x$ pixels in the X direction are sampled for every $S_y$ horizontal rows in the image.

In one preferred embodiment, the values of $t_{min}$ and $u_{min}$ are both zero and the subsampling factors $S_x$ and $S_y$ are equal.

This described embodiment is space intensive, especially in its use of binary images. Those of skill in the art would recognize that an actual implementation could use less space than the described implementation such as, for example, by using nested loops to examine the space of possible w and h pairs. Further, generally the range of possible image sizes is small relative to the input image size.

The approach of this invention has a number of advantages, including that it facilitates porting of code with subsampling from one platform to another simply by changing the functions t and a (or u) for the appropriate platform. Further, an constraint satisfying sampling factor does not have to be determined every time the code is ported.

A further advantage of this invention is that subsequent processes and/or algorithms can be varied or changed without having to re-determine the subsampling factors each time. All that needs to be changed are the t and a (or u) functions to reflect the changes in time and accuracy (or uncertainty).

Conversely, subsequent changes in the required constraints (bounds, for example, $u_{min}$ and $u_{max}$) can be accommodated without changing the processes and/or algorithms.

Furthermore, one can test whether the process and/or algorithm can still satisfy all the constraints. Still further, all of the processing of this algorithm can be done off-line if necessary in order to determine the subsampling factors to use thereafter without actually performing the subsampling until the overall process is executed.

A more limited case, where $S_x=S_y$, t is monotonically increasing with w and h, and u is monotonically decreasing with w and h (that is, one-dimensional subsampling), is now described.

To obtain the range of possible constraint satisfying subsampling factors, solve the functions t and u as follows:

Solve for the maximum $St_{max}$ (the subsampling factor) such that:

$$t_{min} \leq t\ (w_c/St_{max},\ h_c/St_{max}) \qquad (1)$$

Solve for the minimum $St_{min}$ (the subsampling factor) such that $$t_{max} \leq t\ (w_c/St_{min},\ h_c/St_{min}) \qquad (2)$$

Solve for the minimum $Su_{min}$ (the subsampling factor) such that:

$$u_{min} \leq u\ (w_c/Su_{min},\ h_c/Su_{min}) \quad (3)$$

Solve for the maximum $Su_{max}$ (the subsampling factor) such that $$u_{max} \leq (w_c/Su_{max},\ h_c/Su_{max}) \quad (4)$$

The range of possible constraint satisfying subsampling factors is given by $\max(S_{min}, Su_{min})$ to $\min(St_{max}, Su_{max})$. Thus, once all the constraints (for example, $t_{max}$, $t_{min}$, etc.) have been met, there will generally be multiple solutions for the subsampling factor. Generally, any factor S in the range of constraint satisfying subsampling factors can be selected and will be satisfactory.

As described (with reference to FIG. 2), the constraints provided to the subsampling process P16 relate to downstream processes P12' and the time taken by the subsampling process itself. In other preferred embodiments, the constraint functions could also be functions of upstream operations (for example, the time take to obtain the image at P10' and/or the time of initial image processing at P14), thereby enabling constraints on overall process/algorithm performance (time, space, etc.).

EXAMPLE

This example is provided only to show one particular use of this invention and is in no way intended to limit the scope or application of this invention.

Determining of the time and uncertainty functions is now described for a particular example of an image processing process designed to determine the angle of a rectangular article in the image.

1. Perform Gaussian smoothing with a filter bandwidth of $1/(2S_x)$ in X, and $1/(2S_y)$ in Y.
2. Subsample the image by $S_x$ and $S_y$.
3. Run a boundary tracker/angle histogrammer tool in order to determine the angle of a rectilinear article expected to be in the image.

To determine the time of these three operations as a function of the subsampled image's width and height, w and h, note that (a) Gaussian smoothing can be accomplished in time proportional to the size of the original image, and to $S_x$ $S_y$. We also know (either from the hardware specification or by measuring empirically) that it takes approximately 10 ms for an image size of 512×512 with a subsampling factor of 2 in each dimension. Therefore, $$t_1(S_x, S_y) = w_c \times h_x S_x \times S_y/(512 \times 512 \times 2 \times 2) \times 10\ ms$$

or $$t_1(w, h) = (w_c \times h_c)^2/(w \times h \times 512 \times 512 \times 2 \times 2) \times 10\ ms$$

(b) Subsampling can be performed in time proportional to the number of pixels in the original image, and inversely proportional to the subsampling factors. It is also known (either from the hardware specification or by measuring empirically) that subsampling can be performed in approximately 2 ms for an image of size 512×512 with a subsampling factor of 2. Therefore, $$t_2(S_x, S_y) = w_c \times h_c \times 2 \times 2/(S_x \times S_y \times 512 \times 512)\ 2\ ms$$

or $$t_2(w, h) = w \times h \times 2 \times 2/(512 \times 512) \times 2\ ms$$

(c) The boundary tracker tool runs in time proportional to the boundary of the article in the image. It is known that the boundary of the article in physical space is approximately 4000 mm, and that the calibration specifies a pixel size of 100 mm×100 mm in the original image, which gives a boundary in image space of approximately $$20/S_x + 20/S_y\ pixels$$

in the subsampled image. Finally, it is known (either from the hardware specification or empirical measurements) that the time necessary to track the boundary of an article with a perimeter of 100 pixels is approximately 4 ms. Therefore, $$t_3(S_x, S_y) = 20\ (1/S_x + 1/S_y)\ /100 \times 4\ ms.$$

or $$t_3(w, h) = 20(w/w_c + h/h_c)\ /100 \times 4\ ms.$$

In this case, the time function would be given by $$t(w,h) = t_1(w, h) + t_2(w, h) + t_3(w, h)$$

To determine the angular uncertainty of the downstream operation (for example, boundary tracker) as a function of w and h, note (from the Hardware/software specifications) that the boundary tracker/angle histogrammer tool has an uncertainty inversely proportional to (a) the perimeter of the article in the image, and (b) the resolution of the image. Also it is known (from either the hardware/software specifications or statistical experiments) that the uncertainty in the boundary tracker angle result for an image with spatial resolution of 0.1 pixels/mm is approximately 5 degrees. From the time function analysis above, it is known that the imaged article has a physical space perimeter of 4000 mm, and that the input image resolution is 1 pixel/100 mm. Therefore, an upper bound on the uncertainty is $$u(S_x, S_y) = 1/(20(1/S_x + 1/S_y) \times 1/(\max(S_{x\ Sy}) \times 100)\ ). \times 0.1 \times 40 \times 5\ degrees$$

or $$u(w, h) = 5 \times \max(w_c/w, h_c/h)/(w/w_c + h/h_c)\ degrees$$

EXAMPLE

This example is provided only to show one particular use of this invention and is in no way intended to limit the scope or application of this invention.

Figure 5:
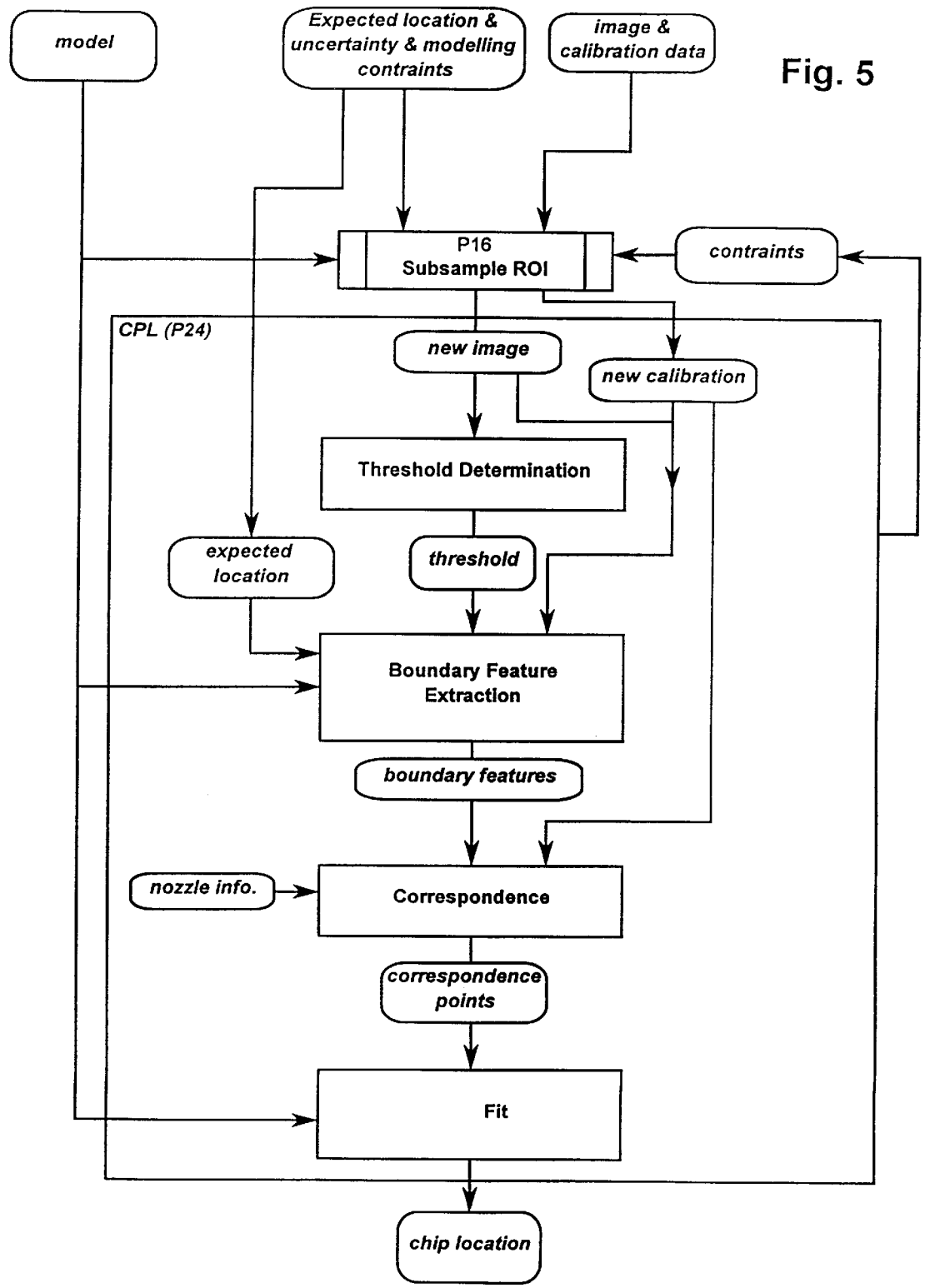
FIG. 5 shows a block diagram illustrating a particular application of this invention to a coarse part location (CPL) process for a surface mount device (SMD).

The constraint satisfying subsampling has been applied to an image processing system for surface mount device (SMD) inspection and placement. FIG. 5 is a block diagram showing an overview of a coarse part location (CPL) process performed by the illustrated embodiment.

The process shown in FIG. 5 is described in related co-pending U.S. Patent Application entitled "A System for Determining the Position of a Generally Rectangular Device," filed concurrently herewith on Mar. 18, 1997 in the names of Robert Drisko, Toshi Motoyama and Ivan Bachelder, and which Application is hereby expressly incorporated by reference in its entirety.

Inputs to the CPL process of FIG. 5 include image and calibration data, presentation angle and uncertainty, modeling constraints, and perhaps nozzle information.

Image data is collected in an image coordinate space ("image space") that is defined by the field of view of the device used to collect the image data, for example, a camera. Calibration data relates image data in the image coordinate space to a physical coordinate space ("physical space"), the physical coordinate space being defined with reference to the mounter used to place SMDs on printed circuit boards (PCBs).

The subsampling process at P16 in FIG. 5 is that described above with reference to FIGS. 2–4.

The aim of the CPL processing (at P24) is to get a rough estimate of where an SMD such as a chip is located in an input image, quickly. This allows a subsequent fine part locator (FPL) process to determine the exact SMD position by making exact measurements in localized areas. Because speed is an issue in CPL, the idea is to subsample the image so that there is much less information to process downstream at the expense of less accuracy. Constraint satisfying subsampling is a way to choose a subsampling factor (or factors) such that accuracy and speed constraints are simultaneously met. In the case of the SMD algorithm described, the aim is to make sure the CPL stage determines the rough orientation of an SMD with sufficient accuracy, while processing within a given time interval.

As to constraint satisfying subsampling (at P16) in a particular implementation of an SMD algorithm, the subsampling factors $S_x$ and $S_y$ are equal (S). As for constraints, there is no maximum accuracy (this is probably typical), but the constraints do require that the angle found by the coarse part location stage downstream be accurate to within 5 decrees (unfx) There are no explicit time constraints ($t_{max}$=infinity, $t_{min}$=0), but the system prefers the solution with the fastest time. The scale factor is constrained to be a factor of two (due to hardware subsampling requirements).

Since there is no explicit time requirement, it is enough in this case to know that the time function of downstream operations is monotonically decreasing with the subsampling factor (or t(w, h) monotonically increases with w and h).

The uncertainty function u(w, h) is considered a function of subsampling. It is estimated from the operations performed in the downstream parts (CPL at P18), that the determination of SMD corner features is uncertain by approximately one pixel for power of two used to subsample the image. This estimation is based on empirical observation. Therefore, the maximum uncertainty in the estimated orientation of the SMD in the image is a monotonically decreasing function of w or h, equal to arctan(2 $\log_2(w_c/w)$/d))=arctan(2$\log_2(h_c/h)$/d), where d is the distance (in pixels) from one corner of the chip to the opposite corner, computed from a model of the chip.

This particular case of constraint satisfying subsampling illustrates how the appropriate algorithm for determining the subsampling factor can be optimized according to which constraints are present or absent. The general algorithm will work for any conditions, but in this case, a closed form solution to the problem (the solution to equations (1)–(4) above) is determined, where $St_{max}$=infinity, $St_{min}$=1, $Su_{min}$=1, $$SU_{max} = 2^{\lceil \tan(u_{max}) \times d_{min}/2 \rceil}$$

where $u_{max}$ is the maximum uncertainty (five degrees) tolerated, and where $d_{min}$ is the minimum length of the chip's diagonal, determined using the current image calibration and the chip model tolerances.

The range of subsampling factors is 1 to $Su_{max}$. Since time is monotonically decreasing, the value $Su_{max}$ is selected.

This constraint satisfying value will change if the function u is changed.

This example of the invention has been implemented on various SMD inspection and placement systems, specifically the COGNEX frontlight chip inspection system, described in Cognex 4000/5000 SMD Placement Guidance Package User's Manual, Release 3.2, which is incorporated herein by reference in its entirety. The COGNEX chip inspection system uses a Cognex Vision Processor 3000/4000/5000. The system of this invention was programmed in C and C++. The subsampling for this implementation used the Cognex $CIP_{13}$Sample Routine described in the Cognex 3000/4000/5000 Programming Vision Engines manuals *Vision Tools and Image Processing* (Revision No. 7.4), hereby incorporated herein by reference in their entirety.

In general, determining the time, accuracy, uncertainty and implementation constraints is implementation specific. Generally the various requirements and constraints can either be computed or they may be obtained from a manufacturer. For example, Cognex publishes the times of its algorithms as a function of hardware type. It may also be possible to empirically time each of the downstream operations as a function of w and h (or subsampling factor).

Further, it may be possible to adapt the time function from a rough estimate (or even an estimate based on the method above), by correcting the function at the values of w and h actually tried by the algorithm. Those values not tried may be interpolated from the actual known (tried) values.

The accuracy (uncertainty) can be handled in much the same fashion. Again, many companies such as Cognex publish the accuracy of their algorithms. It may also be possible to train the algorithm by running it on a database of known images for particular subsampling values or on automatically (synthetically) generated images. For example, Cognex SMD inspections are capable of empirically determining accuracy by running a random synthetic device generator called Monte Carlo as described in Cognex 4000/5000 SMD Placement Guidance Package User's Manual, Release 3.2, referenced above.

The constraints described generally relate to algorithm complexity (for example, time and the like). However, constraints may also relate to any other aspect of complexity (for example, space), or other measurable performance requirements that vary with the subsampling factors and/or image size.

Although described with reference to a particular system, the present invention operates on any image processing system and can be implemented in software, hardware or any combination thereof. When implemented fully or partially in software, the invention can reside, permanently or temporarily, on any memory or storage medium, including but not limited to a RAM, a ROM, a disk, an ASIC, a PROM and the like.

In preferred embodiments, the subsampling is dynamic in the sense that different input image sizes may produce different subsampling factors, all other constraints being equal.

Thus, an constraint satisfying subsampling system and method are provided. One skilled in the art will appreciate that the present invention can be practiced by other than the described embodiments, which are presented for purposes of illustration and not limitation, and the present invention is limited only by the claims that follow.

What is claimed:

1. In an automated object inspection system involving locating an object in an input image, an image processing method comprising:

obtaining a pixel representation of an input image including said object;

obtaining expected geometric parameters representing certain expected geometric features of said object;

selecting from said pixel representation a set of pixels required for input to an object locating process;

defining, after said selecting said set of pixels and after said obtaining said expected geometric parameters, a subsampling factor based upon at least said expected geometric parameters, said subsampling factor defining a reduction in resolution of said set of pixels;

subsampling said set of pixels in accordance with the defined subsampling factor; and running said object locating process on the subsampled set of pixels, wherein said defining further comprises:
 determining a set of image sizes, satisfying a function t, which yields results between a maximum and a minimum allowed times;
 determining a set of image resolutions, satisfying a function u, which yields an appropriate accuracy; and
 selecting the subsampling factor based on an intersection of the set of image sizes and the set of image resolutions.

2. The method according to claim 1, wherein said defining a subsampling factor comprises estimating an uncertainty value indicative of an uncertainty in a location to be determined by running said object locating process, and defining said subsampling factor so said uncertainty value falls within a desired uncertainty range.

3. The method according to claim 2, wherein said defining said subsampling factor comprises defining said subsampling factor so said time value is maximized while said uncertainty value falls within said desired uncertainty range.

4. The method according to claim 3, wherein said object comprises a surface mounted device (SMD).

5. The method according to claim 1, wherein said object comprises a surface mounted device (SMD).

6. Computer-readable media tangibly embodying a program of instructions executable by the machine to perform functions including:

obtaining a pixel representation of a input image including said object;

obtaining expected geometric parameters representing certain expected geometric features of said object;

selecting from said pixel representation a set of pixels required for input to an object locating process;

defining, after said selecting said set of said pixels and after said obtaining said expected geometric parameters, a subsampling factor based upon at least said expected geometric parameters, said subsampling factor defining a reduction in resolution of said set of pixels;

subsampling said set of pixels in accordance with the defined subsampling factor; and running said object locating process on the subsampled set of pixels, wherein said defining further comprises:
 determining a set of image sizes, satisfying a function t, which yields results between a maximum and a minimum allowed times;
 determining a set of image resolutions, satisfying a function u, which yields an appropriate accuracy; and
 selecting the subsampling factor based on an intersection of the set of image sizes and the set of image resolutions.

7. The method according to claim 6, wherein said defining a subsampling factor comprises estimating an uncertainty value indicative of an uncertainty in a location to be determined by running said object locating process, and defining said subsampled factor so said uncertainty value falls within a desired uncertainty range.

8. The method according to claim 7, wherein said defining said subsampled factor comprises defining said subsampled factor so said time value is maximized while said uncertainty value falls within said desired uncertainty range.

9. The method according to claim 8, wherein said object comprises a surface mounted device (SMD).

10. The method according to claim 6, wherein said object comprises a surface mounted device (SMD).

11. An automated object inspection system involving locating an object in an input image, said system comprising:

means for obtaining a pixel representation of an input image including said object;

means for obtaining expected geometric parameters representing certain expected geometric features of said object;

means for selecting from said pixel representation a set of pixels required for input to an object locating process;

means for defining, after said set of pixels is selected and after said expected geometric parameters are obtained, a subsampling factor based upon at least said expected geometric parameters, said subsampling factor defining a reduction in resolution of said set of pixels;

means for subsampling said set of pixels in accordance with the defined subsampling factor; and means for running said object locating process on the subsampled set of pixels wherein said means for defining further comprises:
 means for determining a set of image sizes, satisfying a function t, which yields results between a maximum and a minimum allowed times;
 means for determining a set of image resolutions, satisfying a function u, which yields an appropriate accuracy; and
 means for selecting the subsampling factor based on an intersection of the set of image sizes and the set of image resolutions.

12. The system according to claim 11, wherein said defining a subsampling factor comprise estimating an uncertainty value indicative of an uncertainty in location determined by running said object locating process, and means for defining said subsampling factor so said uncertainty value falls within a desired uncertainty range.

13. The system according to claim 12, wherein said means for defining said subsampling factor comprise means for defining said subsampling factor so said time value is maximized while said uncertainty value falls within said desired uncertainty range.

14. The system according to claim 13, wherein said object comprises a surface mounted device (SMD).

15. The system according to claim 11, wherein said object comprises a surface mounted device (SMD).

16. The method of claim 1, wherein said defining further comprises selecting the subsampling factor that is allowable by hardware constraints and software constraints.

17. In an automated object inspection system involving locating an object in an input image, an image processing method comprising:

obtaining a pixel representation of an input image including said object;

obtaining expected geometric parameters representing certain expected geometric features of said object;

selecting from said pixel representation a set of pixels required for input to an object locating process;

defining, after said selecting said set of pixels and after said obtaining said expected geometric parameters, a subsampling factor based upon at least said expected geometric parameters, said subsampling factor defining a reduction in resolution of said set of pixels;

subsampling said set of pixels in accordance with the defined subsampling factor; and running said object locating process on the subsampled set of pixels, wherein said defining further comprises: creating space for a two-dimensional matrix T of size $(w_{max}-w_{min}, h_{max}-h_{min})$, where w is a width and h is a height, and space for a two-dimensional matrix U of size $(w_{max}-w_{min}, h_{max}-h_{min})$;

setting a value of the matrix T(w,h) to a value indicating satisfaction of a time function t(w,h) if a value of the time function t(w,h) is greater than a minimum value of allowable time $t_{min}$ and the value of the time function t(w, h) is less than a maximum value of allowable time $t_{max}$, otherwise setting the value of the matrix T(w,h) to a value indicating no satisfaction of the time function t(w,h).

* * * * *